US008666902B2

(12) United States Patent
Grisham et al.

(10) Patent No.: US 8,666,902 B2
(45) Date of Patent: Mar. 4, 2014

(54) SYSTEM AND METHOD FOR ACCESSING READ ONLY ANSI TABLES IN AN ELECTRICITY METER

(75) Inventors: Gregory A. Grisham, West Lafayette, IN (US); John P. Junker, Lafayette, IN (US); Gordon R. Burns, West Lafayette, IN (US)

(73) Assignee: Landis+Gyr Inc., Lafayette, IN (US)

( * ) Notice: Subject to any disclaimer, the term of this patent is extended or adjusted under 35 U.S.C. 154(b) by 2593 days.

(21) Appl. No.: 10/729,852

(22) Filed: Dec. 5, 2003

(65) Prior Publication Data
US 2005/0125361 A1 Jun. 9, 2005

(51) Int. Cl.
*G06Q 20/00* (2012.01)

(52) U.S. Cl.
USPC ................. 705/63; 705/52; 705/76; 705/909

(58) Field of Classification Search
USPC ...................................................... 705/50–79
See application file for complete search history.

(56) References Cited

U.S. PATENT DOCUMENTS

| | | | | |
|---|---|---|---|---|
| 4,918,728 A | * | 4/1990 | Matyas et al. ................ | 380/280 |
| 5,077,660 A | * | 12/1991 | Haines et al. ................ | 705/410 |
| 5,107,455 A | * | 4/1992 | Haines et al. ..................... | 710/8 |
| 5,627,759 A | | 5/1997 | Bearden | |
| 5,715,390 A | * | 2/1998 | Hoffman et al. ................ | 726/20 |
| 5,719,941 A | * | 2/1998 | Swift et al. .................... | 713/155 |
| 5,784,463 A | * | 7/1998 | Chen et al. .................... | 713/171 |
| 5,966,311 A | * | 10/1999 | Stemporzewski et al. .... | 700/281 |
| 6,043,642 A | | 3/2000 | Martin | |
| 6,067,622 A | * | 5/2000 | Moore ............................ | 726/31 |
| 6,429,785 B1 | * | 8/2002 | Griffin et al. ............ | 340/870.02 |
| 6,871,286 B1 | * | 3/2005 | Cagle et al. ........................ | 726/5 |
| 7,065,457 B1 | * | 6/2006 | Germer et al. .................. | 702/64 |
| 2004/0264701 A1 | * | 12/2004 | Lee et al. ...................... | 380/270 |
| 2006/0072745 A1 | * | 4/2006 | Fukaya ............................ | 380/28 |
| 2006/0280297 A1 | * | 12/2006 | Fukaya ............................ | 380/28 |
| 2008/0137848 A1 | * | 6/2008 | Kocher et al. .................. | 380/201 |

OTHER PUBLICATIONS

Michael Kintner-Meyer, Utility/Energy Management and Control System Communication Protocol Requirements, Jul. 1999, pp. 92, 162.*

How Computers Work, $6^{th}$ edition. White, Ron. Que Corporation, 2002. ISBN 0-7897-2549-5. Complete book included.*

(Continued)

*Primary Examiner* — Jacob C. Coppola
(74) *Attorney, Agent, or Firm* — Maginot, Moore & Beck LLP

(57) ABSTRACT

A utility meter implementing the ANSI C12.19 standard is able to bypass security processing using Decade4 security tables for a single data access operation. The meter includes a procedure that is executed by a processor in the meter to process requests for security keys. Data internal to the meter is used to generate a security key. The security key is used by the requesting external device and the procedure to generate an access key. The external device sends its access key to the procedure so it may be compared to the internally generated access key. If both access keys are the same, a data access operation performed by the external device is allowed without reference to the Decade4 security tables. Once a timeout or data access operation is performed, subsequent data access operations are subject to processing in accordance with the Decade4 security tables unless another security key is requested for repetition of the process.

18 Claims, 4 Drawing Sheets

(56) References Cited

OTHER PUBLICATIONS

RSA SeurID Authentication: A Better Value for a Better ROI. Located at <http://www.opsec.com/solutions/partners/downloads/rsa_securid_roi.pdf>. Copyright 2001.*

Handbook of Applied Cryptography. Menezes et al. CRC Press, 1996. Available at <http://www.cacr.math.uwaterloo.ca/hac>. Chapters 1 and 7-13 included.*

Wiseman et al., AEIC Guidelines for Implementation of ANSI C12. 19-1997 "Utility Industry End Device Data Tables," 1998, all pages.*

Moise, Dr. Avygdor, Audit Trail Implementation Guide for ANSI C12.19 / IEEE 1377, Utility Industry Standard Tables, 2002, version 3.0, all pages.* www.kema.com, Getting acquainted with ANSI C12.19 and C12.22, May 2009, all pages.*

Ted York, *Electric Perspectives Metering*, Edison Electric Institute, Sep./Oct. 2001 [online]. Retrieved from the internet: <http://www.eei.org/magazine/editorial_content/ nonav_stories/2001-09-01-metering.htm>.

Elster Electricity, LLC *A3 ALPHA®Meter*, informational brochure and product specifications, Apr. 2003.

ABB, Inc. 2001 *Metering and Communications Systems*, Sep. 10, 2002 [on line]. Retrieved from the internet: <www.energy.ca.gov/.../Session%205_Metering_Communications/Andrus_ABB_Metering_CommSys.ppt>.

*AEIC Guidelines for Implementation of ANSI C12 19-1997*, Sep. 21, 1998 [on line]. Retrieved from the Internet <http://www.aeic.org/meter_service/GuidelinesWGFinal.doc>.

* cited by examiner

SYSTEM AND METHOD FOR ACCESSING READ ONLY ANSI TABLES IN AN ELECTRICITY METER

FIELD OF THE INVENTION

The present invention relates to utility meters, and in particular, to utility meters that include ANSI C12.19 tables for storing programs or data for use by one or more programmable processors within a meter.

BACKGROUND OF THE INVENTION

Utility meters, for example, electricity meters, often employ microprocessors to obtain comprehensive information regarding consumption of a monitored commodity by a facility or system. In the past, mechanical counter-type meters could only provide limited information such as the accumulated total quantity of electricity, gas, or water consumed. However, current processor-based meters have the capability of providing a variety of functions related to the monitored commodity. For example, processor controlled electricity meters are able to provide one or more of the following functions: voltmeter, watt meter, VA meter, distortion indicator, ammeter, VAR meter, phase angle meter, and phase rotation meter. Additionally, such meters are able to perform usage analysis such as load-profiling as it is known in the electricity metering industry, demand analysis to identify high demand periods during a day or a month, time of use metering to evaluate cost rates that vary according to the time of day, and diagnostics of both the meter and the system to which it is connected. In the case of electricity meters, such advanced capabilities still require fundamental metering measurements, such as voltage, current, energy and reactive energy. The processing device uses the fundamental measurement information (and a real-time clock if necessary) to perform any or all of the above advanced functions.

One problem facing the industry is that with so many functions available, there is a need to allow energy customers and/or utilities to define what functions they desire their meters to perform. Energy customers typically fall into one of three classes: high end users, commercial users, and residential users. High end users are typically energy producers who want to monitor energy parameters at distribution nodes and switching yards. Commercial users include manufacturing facilities as well as office and retail complexes that have a meter for each machine on a manufacturing line or a meter for each tenant, respectively. Residential users are single family dwellings with meters for measuring usage on a billing cycle basis. High end and commercial users are likely to want to have some control over the functionality implemented by a meter while a utility probably controls the type and number of functions performed by meters for its residential customers.

Until 1997, the data and functions used in meters and available from meters were typically proprietary concerns of the meter manufacturers. In 1997, ANSI promulgated its C12.19 standard to provide interoperability for programmable meters. These standards were developed to define a set of flexible data structures called tables for use in metering devices. The standard also formulated a protocol for identifying and describing these tables. Additionally, the standard included manufacturer-defined tables in an effort to support further flexibility. The data stored in these tables control how the meter processes data, what calculations it performs, and what outputs it produces. These functions include the time and date with support for daylight savings time, time of use rates, total usage monitoring, rate calculations, a list identifying the items to be displayed by the meter, and timing parameters for relay control. The table data organization is an improvement over the previous industry practice, which was to write custom software to perform all of these functions.

The tables defined by ANSI C12.19 are organized by decades. The Decade0 tables are configuration tables for a meter. Table00 in Decade00 is a general configuration table. Among the data included in this table are two data fields, one of which identifies the standard tables to which data may be written and the other of which identifies the manufacturer tables to which data may be written. The data placed in these fields is determined by the manufacturer of the meter. The Decade4 tables are security data tables for the meter. A list of passwords may be stored in Table42. Each password is for a group level. A default data field for each group level is maintained in Table43 that defines the tables in the meter that a user presenting the corresponding password may read/write or read only. Data that modifies the group access data stored in Table43 is stored in Table44. Thus, during a communication session, a meter may communicate with an external device to determine its group level and respond to its read and write requests in accordance with the data stored in Table43 and Table44.

While the data structures of the ANSI standard promote open platform access for metering devices, the structure suffers from some limitations. One limitation is the possibility that a meter manufacturer may limit a particular group's access to a data table to be read-only. Consequently, an external device at a manufacturer's facility or in the field communicating with a meter may be denied access to write data to one of the data tables within a meter. One example of a need to write data into an inaccessible table may occur when a field technician determines that a meter is out of calibration. As a result, the technician may need to write new calibration parameters into the meter's memory in order to bring it back into calibration. If the equipment used by the technician cannot supply a password to the Decade4 tables for a group that is authorized to write data into the appropriate table, the meter cannot be brought into calibration. Another limitation may occur when a factory or field technician needs to write a procedure or operational data into a data table to upgrade the meter's capability. Again, the Decade4 security tables may deny the equipment used by the technician to write data into the appropriate table. However, assigning a group level to the field service or factory device may grant the device access to data areas other than those required for effective servicing. Furthermore, setting group level access codes to values that accommodate occasional needs is overkill and may subject the meter to unauthorized tampering. Probably the most frequently occurring need arises when meter functions are modified or new meter functions are added at a factory or in the field. This task is also adversely impacted when the external devices used by the factory or field personnel are not authorized to modify particular tables within a meter.

What is needed is a way of occasionally bypassing the security provided by the Decade4 tables so that data may be written into ANSI C12.19 data tables.

What is needed is a way of screening access attempts to write data into ANSI C12.19 data tables that selectively enables data writes into data tables that are read only for a particular group level.

SUMMARY OF THE INVENTION

The above problems are addressed by providing a utility meter with a procedure for selectively enabling a data write to a read only data table. The inventive procedure is comprised of a security component and a security bypass component. The security component of the procedure includes a security key generator, an access key generator, and an access key comparator. The generated security key is provided to an external device. The external device and access key generator of the procedure each generate an access key and the external device sends its generated access key to the procedure. The access key comparator of the procedure compares the access key from the external device to the access key generated by the procedure and, if the two access keys are the same, the bypass component is activated. The bypass component includes an unlock timer and a data access monitor. If the monitor detects a data access operation by the external device before the timer expires, it allows the operation to occur regardless of the access data state for the group level of the external device. After the data access operation occurs or the time expires, the bypass component is deactivated so that any subsequent data access operation is handled by a procedure using the Decade4 security tables.

Preferably, the security key is generated from variable data within the meter so that it is not a constant value. Preferably, the variable data is arithmetically combined with data associated with the meter so the security is unique to each meter. The variable data helps prevent an intruder from indefinitely attempting to determine the security key generation scheme and the use of the meter data to generate the security key adds variability between meter devices for additional security. Preferably, the security key is augmented by the external device with additional data that is also stored in the meter. Both the external device and security component operate on the augmented key to generate the access key. The operation performed on the augmented key may be any known encryption algorithm or hashing function. The output of the operation on the augmented key is an access key. As long as the external device and security component generated the same result, the bypass component is activated to bypass the Decade4 security tables for the next data access by the external device. Otherwise, the next data access by the external device is subject to the Decade4 security tables.

A method for implementing the principles of the present invention includes generating a security key, providing the security key to an external device, generating an access key from the security key, and comparing the generated access key to an access key generated by the external device to determine whether a data access by the external device is subject to security procedures. The method may also include augmenting the security key before generating the access key to enhance the security of the method. Furthermore, the method subjects additional data accesses to security procedures unless another security key is requested and another access key is generated for determining whether security procedures are bypassed.

It is an object of the present invention to support the occasional bypassing of the security provided by the Decade4 tables so that data may be written into ANSI C12.19 data tables.

It is an object of the present invention to screen data access attempts to write data into ANSI C12.19 data tables so that data writes to tables that are read only may be selectively activated.

BRIEF DESCRIPTION OF THE DRAWING

The present invention may take form in various system and method components and arrangement of system and method components. The drawings are only for purposes of illustrating exemplary embodiments and are not to be construed as limiting the invention.

DESCRIPTION OF THE INVENTION

Figure 1:
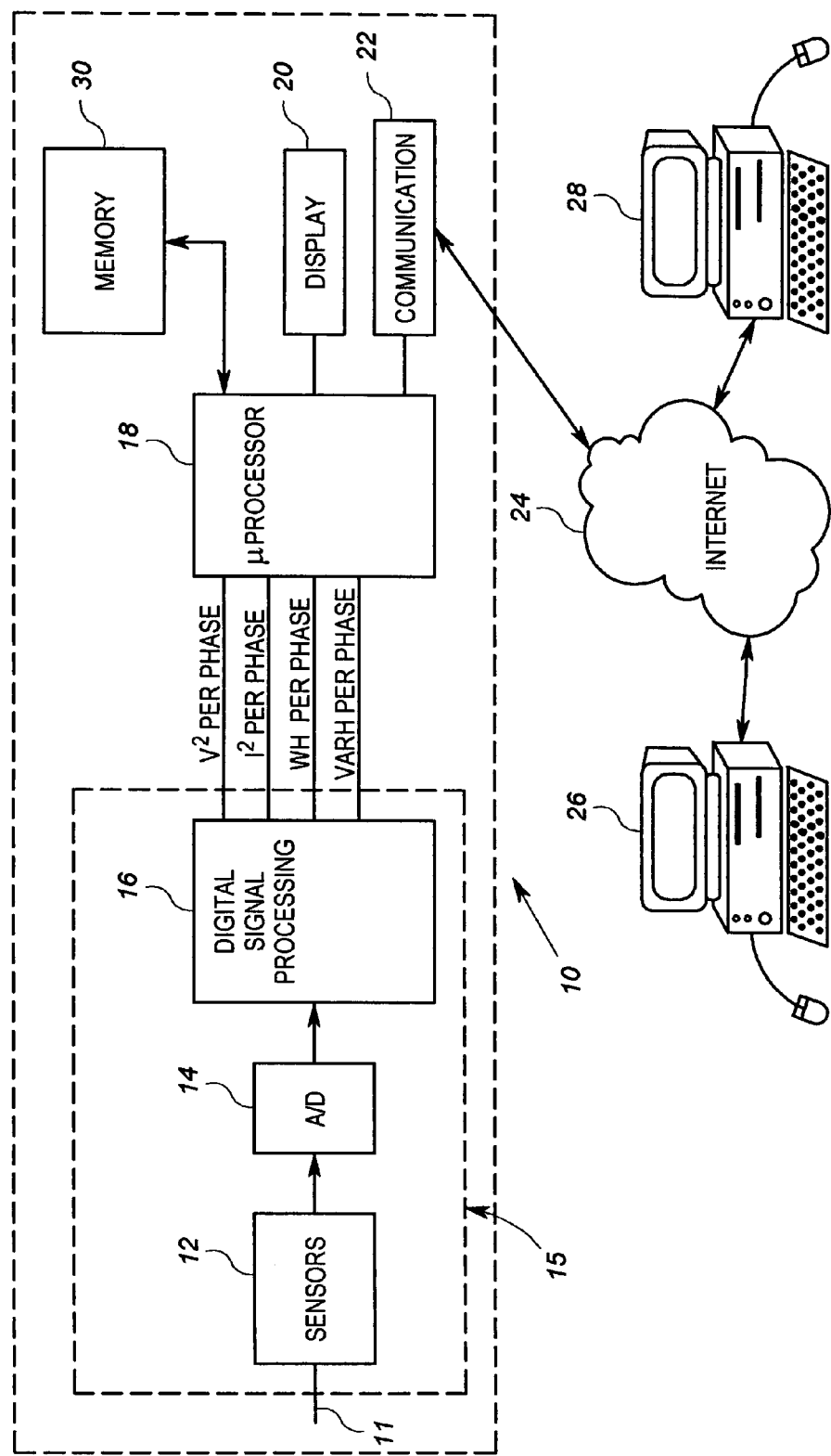
FIG. 1 shows an exemplary block diagram of a meter in which a system and method of the present invention may be used.

FIG. 1 shows an exemplary system in which the present invention may be implemented. The system includes a meter 10 that operates in accordance with the principles of the present invention. Meter 10 is communicatively coupled to a plurality of utility host computers, exemplified by external computers 26 and 28, via a computer network 24, such as the Internet. Of course, network 24 may be any computer network such as a local area network (LAN) or wide area network (WAN) that supports communication between computers on network 24 and meter 10. Alternatively, the network may be a telephone network and meter 10 may be provided with a modem for the communication of data with a remote utility host. Although not shown, meter 10 may also communicate with an external handheld device as may occur in a field service or factory service situation. The external handheld device may communicate with meter 10 through an optical port, such as an infrared communication port, or a hardwired port, such as a cable terminating in a connector that mates with a connector on the meter. Alternatively, an external handheld device or utility host may communicate with a meter 10 through a radio frequency, cellular network, or other wireless method.

Meter 10 includes a signal processing component 15, a processor 18, a display 20 and a communication circuit 22. Signal processing component 15 is operable to measure a consumed quantity and generate basic consumption data therefrom. In the exemplary embodiment of an electricity meter described herein, the basic consumption data may suitably include voltage information, current information, energy information (watt-hours), and reactive energy information. By way of example, signal processing component 15 includes one or more voltage and current sensors 12, one or more A/D converters 14 and a digital signal processor 16. Further detail regarding suitable signal processing elements of meters may be found in U.S. Pat. No. 6,043,642 and U.S. Pat. No. 5,627,759, both of which are expressly incorporated herein by reference. Electricity is often provided in multiple phases. Accordingly, voltage and current sensors 12, A/D converters 14 and digital signal processor 16 may be configured to generate the basic consumption data for each phase as taught by U.S. Pat. No. 6,043,642 and U.S. Pat. No. 5,627,759.

Signal processing component 15 provides the basic consumption data to processor 18. Processor 18 may execute meter function programs persistently stored in memory 30 to generate various metering totals and perform various meter functions using the basic consumption data. Such functions may include time-of-use metering, demand metering, various types of diagnostics, load profiling, harmonic analysis, power quality metering and other types of meter functions known in the art. Processor 18 may display information derived from the performance of the meter functions on display 20. Memory 30 may include persistent storage units such as EEPROM or the like as well as volatile memory such as RAM. Some or all of this memory is organized in accordance with the ANSI C12.19 standard. Variable data generated during the execution of programs by processor 18 may be stored in the volatile portion of memory 30 as these data are generated and/or modified. The ANSI C12.19 standard was developed, in part, to define data structures for the storage of data generated by a meter 10. To limit access to the memory within a meter 10, the standard provides Decade4 security tables. As processor 18 executes its program for communicating with external devices, it uses the data in the Decade4 tables to correlate an external device to a group and to identify the type of data operations that the external device may perform on the data tables of meter 10. Consequently, modifying or adding meter functions or parameters at a factory or in the field may be difficult because the external devices used by factory or field personnel may not have authorization to modify particular tables within a meter.

Figure 2:
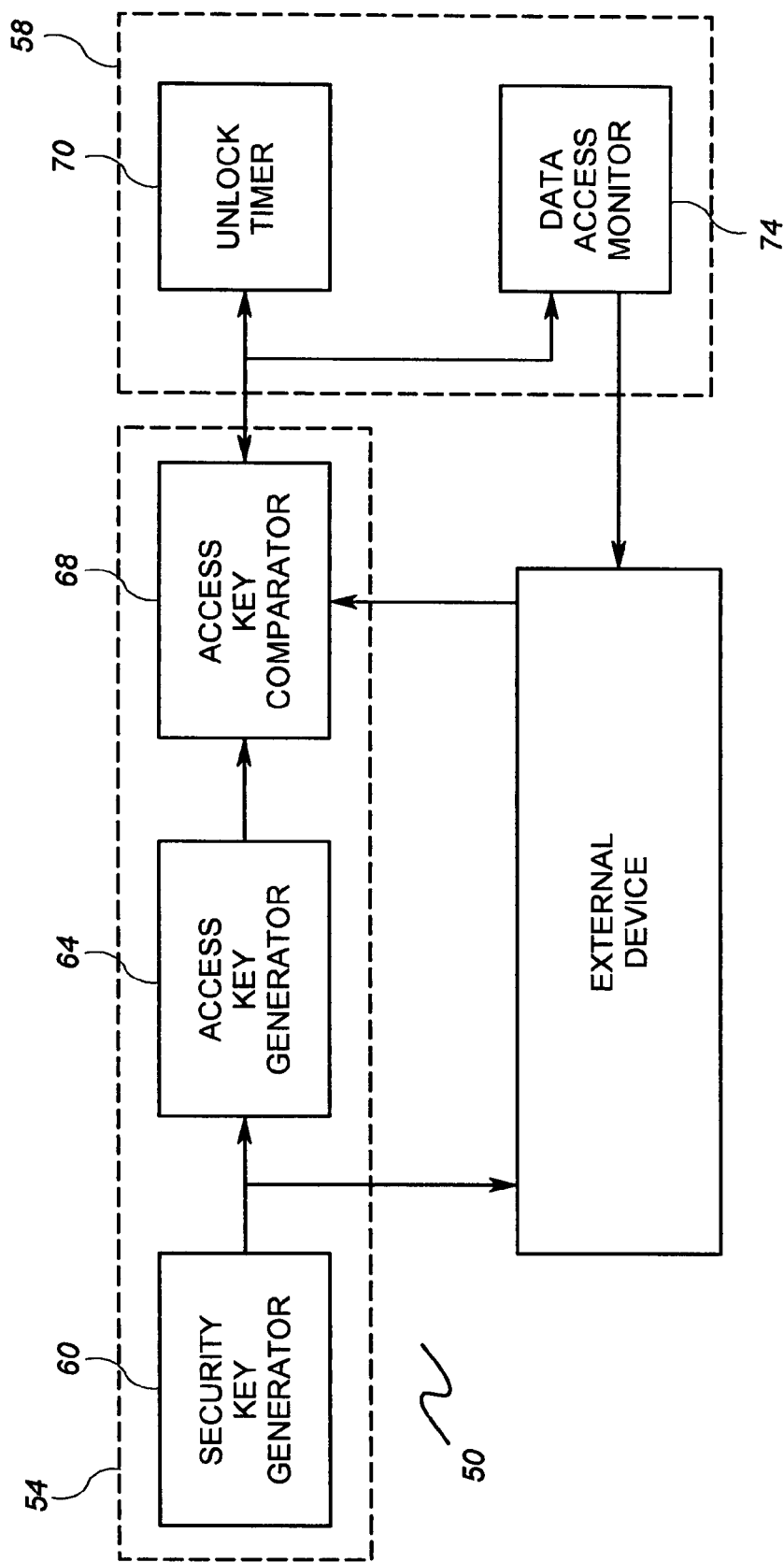
FIG. 2 shows the components of a system that may be incorporated in the meter of FIG. 1 to implement the principles of the present invention.

To provide a meter 10 with additional meter functionality or to change the operational parameters used by a processor within meter 10, a procedure to be executed by processor 18 may be implemented with the components shown in FIG. 2. Procedure 50 includes a security component 54 and a bypass component 58. Procedure 50 is preferably a computer program executed by a processor in the meter. It receives input through Table7 of a meter implementing the ANSI C12.19 standard and its output is placed in Table8. The output data may be later read to determine whether a data access operation was successful. Security component 54 includes a security key generator 60, an access key generator 64, and an access key comparator 68. Security key generator 60 generates a security key that is communicated to the external device. The security key is also provided to access key generator 64 to generate an access key. The external device generates an access key from the security key and sends the resulting access key to access key comparator 68. If the internally generated access key is the same as the externally generated access key, a data operation enable signal is generated and sent to bypass component 54. Bypass component 54 includes an unlock timer 70 and a data access monitor 74. In response to the data operation enable signal, unlock timer 70 is initiated to time an unlock interval and data access monitor 74 monitors data access operations performed by the external device. Upon detection of a data access operation by the external device or upon expiration of the timer, bypass component 58 resets access key comparator so the data operation enable signal is no longer generated. Consequently, subsequent data access operations are processed in accordance with the Decade4 security tables. In this manner, data reads or writes are enabled for any table within meter 10 as long as the external device is able to generate an access key from the security key that is the same as the access key generated by the security component 54. The external device's data access to the tables of meter 10 is limited to one access operation to reduce the likelihood that access not subject to Decade4 security table processing does not continue indefinitely.

Figure 3:
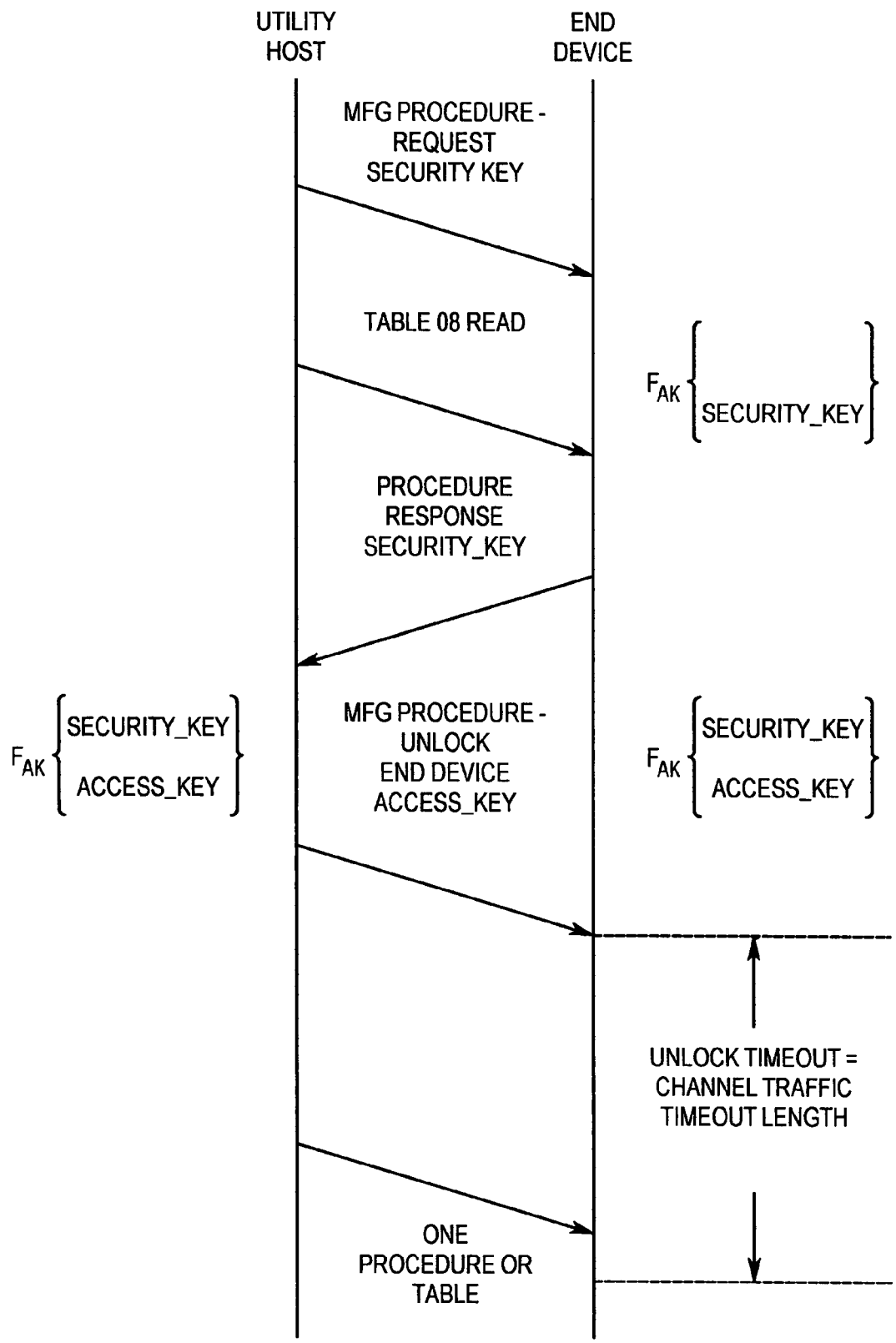
FIG. 3 shows an overview of an exemplary communication session to bypass security procedures for a data table within the meter of FIG. 1.

A portion of a communication session in which the system of the present invention operates is shown in FIG. 3. The portion begins with a request from the external device for a security key. This request invokes a request processing procedure preferably stored in Table7 by the manufacturer. Using a function, $F_{sk}$, procedure 50 generates a security key and stores it in Table8. The external device reads the security key from Table8. Substantially in parallel, the external device and procedure 50 use a function, $F_{ak}$, to generate an access key from the security key. The external device provides the access key it generated to the procedure and the procedure compares it to the one that it generated. If the two are the same, an unlock timer is set. Preferably, the unlock time corresponds to the length of time required for a data access operation by the external device. Once the timer expires or the external device performs a data access operation, such as a read or a write to one of the tables or procedures in meter 10, subsequent data access operations are subject to the security processes implemented with the Decade4 tables.

In a preferred implementation, function $F_{sk}$ forms a security key from variable data within the meter and static data associated with the meter 10. The variable data may be data associated with a value being read by one of the meter's sensors, time data, or the like. Static data may include meter identification data, manufacturer identification data, a combination of such data, or the like. The function may also include arithmetic operations on the data to frustrate attempts to predict a security key. Preferably, both the external device and procedure augment the security key with additional data before submitting the security key to the function $F_{ak}$ to generate the access key. This additional data is stored in the meter 10 by the manufacturer and is also stored in the external device. This additional data further ensures that only authorized users are able to modify the data tables or procedures of a meter without reference to group level security parameters. The function $F_{ak}$ is preferably a known encryption or hashing scheme.

Figure 4:
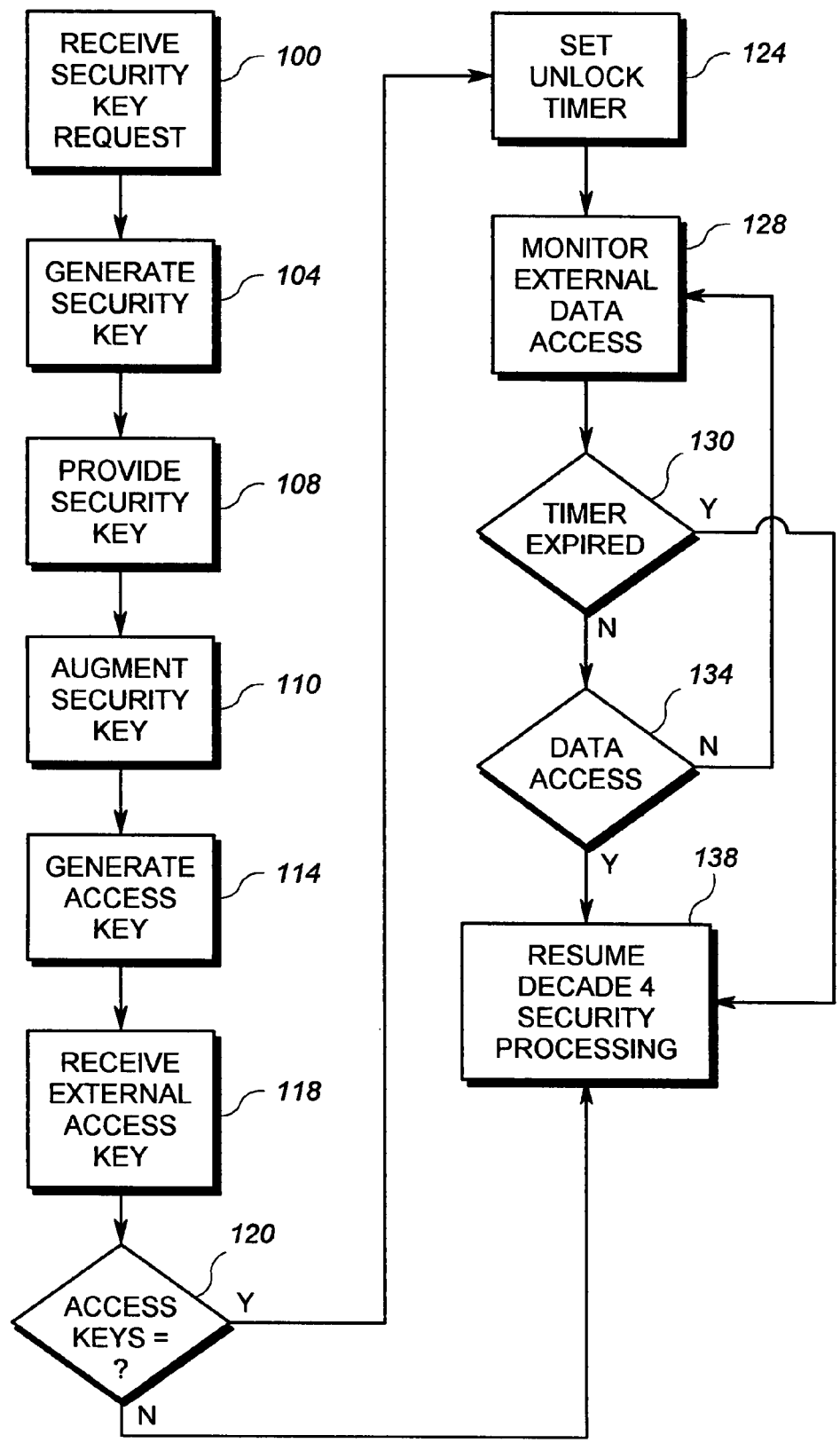
FIG. 4 shows an exemplary method of determining whether to enable a data write to a data table within the meter of FIG. 1.

A method for implementing the present invention in a meter is shown in FIG. 4. The method includes receiving a request for a security key (block 100). A security key is generated (block 104) and provided to an external device (block 108). Preferably, the security key is augmented with additional data (block 110). The augmented security key is processed with a function $F_{ak}$ to generate an access key (block 114). An access key generated by the external device is received (block 118) and compared to the internally generated access key (block 120). If the access keys are the same, an unlock timer is set (block 124) and data access by the external device is monitored (block 128). Otherwise, security processing with Decade4 table parameters resumes (block 138). Once the timer expires (block 130) or the external device performs a data access operation (block 134), security processing using Decade4 tables resumes (block 138) until another security key is requested and the process commences again.

While the present invention has been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed:

1. A utility meter incorporating data structures including security data table parameters, the utility meter comprising:
   a memory storing the security data table parameters including one or more passwords, the security data table parameters associating a first read or write operation with a first password;
   a processing circuit disposed within the utility meter;

wherein the processing circuit, when executing software instructions, is configured to:
perform the first read or write operation responsive to receiving the first password from an external device;
generate a security key;
receive an externally generated access key without receiving the first password;
generate an internal access key from the security key;
determine whether the externally generated access key is the same as the internal access key; and
in response to said determination and without having received the first password, perform the first read or write operation prior to expiration of a predetermined time period.

2. The meter of claim 1, wherein the processing circuit, when executing the software instructions, is further configured to:
generate a security key.

3. The meter of claim 2 wherein the processing circuit, when executing the software instructions, is further configured to generate the security key from variable data and data associated with the meter.

4. The meter of claim 3 wherein the processing circuit, when executing the software instructions, is further configured to arithmetically combine the variable data and the data associated with the meter to generate the security key.

5. The meter of claim 2, wherein the processing circuit, when executing software instructions, is further configured to:
generate the internal access key from the security key.

6. The meter of claim 5 wherein the processing circuit, when executing software instructions, is further configured to augment the security key before generating the internal access key.

7. The meter of claim 5, wherein the processing circuit, when executing software instructions, is further configured to:
compare the internal access key to the externally generated access key.

8. The meter of claim 7, wherein the processing circuit, when executing software instructions, is further configured to:
in the absence of receiving a password or additional externally-generated access key, deny additional data access operations in response to completion of the first read or write operation.

9. The meter of claim 8, wherein the processing circuit, when executing software instructions, is further configured to:
upon expiration of a predetermined timing interval and in the absence of receiving a password or additional externally-generated access key, deny additional data access operations.

10. A method for accessing data in a utility meter, the method comprising:
receiving a request for a security key using a security component of the utility meter, the utility meter having a processor and a memory storing a plurality of tables including security tables in a first data format, wherein the security tables comprise: (i) a first table comprising a first password and a second password, the first password identifying a first level of access and (ii) a second table identifying a first read or write operation that may be performed by an external device supplying the first password, wherein the first read or write operation corresponds to the first level of access;
generating, by the processor, the security key;
generating, by the processor, an access key from the security key;
determining, by the processor, that the generated access key is the same as an access key generated by the external device;
in response to said determining, initiating a timer corresponding to an interval during which the external device has permission to perform the first read or write operation; and
prior to expiration of the interval and without having received the first password from the external device, performing the first read or write operation on the data.

11. The method of claim 10, wherein generating the security key includes:
arithmetically combining variable data with data associated with the utility meter to generate the security key.

12. The method of claim 10, wherein generating the access key includes:
augmenting the security key before generating the access key.

13. The method of claim 10 wherein performing the first read or write operation includes:
monitoring for a data access operation by an external device in response to the comparison of the access keys being the same.

14. The method of claim 10, wherein generating the access key includes:
generating the access key with an encryption function.

15. The method of claim 10, wherein generating the access key includes:
generating the access key with a hashing function.

16. The utility meter of claim 1 wherein the data format comprises a utility meter open standard data format.

17. The meter of claim 1, wherein the processing circuit, when executing software instructions, is further configured to:
in the absence of receiving a password or additional externally-generated access key, deny additional data access operations in response to completion of the first read or write operation.

18. The meter of claim 1, wherein the processing circuit, when executing software instructions, is further configured to:
upon expiration of a predetermined timing interval and in the absence of receiving a password or additional externally-generated access key, deny additional data access operations.

* * * * *